United States Patent [19]

Ferro et al.

[11] Patent Number: 4,865,791

[45] Date of Patent: Sep. 12, 1989

[54] METHOD OF FORMING A SURFACE PROTECTOR WITH AN EXPANSIBLE POCKET

[75] Inventors: Salvatore D. Ferro, Sagamore Hills; Robert A. Isaksen, Chardon; Robert J. Stupi, Stow, all of Ohio

[73] Assignee: The Excello Specialty Company, Cleveland, Ohio

[21] Appl. No.: 152,999

[22] Filed: Feb. 3, 1988

[51] Int. Cl.⁴ .............................. B29C 53/24
[52] U.S. Cl. ........................ 264/134; 264/292; 264/297.4; 264/297.5; 264/339; 427/171
[58] Field of Search ............. 264/292, 297.4, 297.5, 264/339, 134; 427/171

[56] References Cited

U.S. PATENT DOCUMENTS

| | | | |
|---|---|---|---|
| 2,095,776 | 10/1937 | Von Hoffe et al. | 91/68 |
| 2,111,168 | 3/1938 | Chansor | 92/104 |
| 2,824,920 | 2/1958 | Humphreys | 92/104 |
| 2,829,728 | 4/1958 | Brown | 181/149 |
| 3,220,544 | 11/1965 | Lovell | 264/292 |
| 3,684,642 | 8/1972 | Rogers, Jr. | 161/135 |
| 4,090,582 | 5/1978 | Deschu | 181/150 |
| 4,161,995 | 7/1979 | Pohlmann et al. | 181/149 |
| 4,201,612 | 5/1980 | Figge et al. | 156/224 |
| 4,248,651 | 2/1981 | Kojimoto et al. | 264/292 |
| 4,420,520 | 12/1983 | Jones et al. | 428/42 |
| 4,469,732 | 9/1984 | Isaksen et al. | 428/80 |
| 4,544,593 | 10/1985 | Borgert et al. | 428/80 |
| 4,588,627 | 5/1986 | Isaksen et al. | 428/80 |
| 4,604,302 | 8/1986 | Isaksen et al. | 427/208.6 |

FOREIGN PATENT DOCUMENTS

| | | | |
|---|---|---|---|
| 559066 | 7/1957 | Belgium | 264/339 |
| 2409669 | 6/1979 | France . | |
| 86/07563 | 12/1986 | World Int. Prop. O. | 264/297.5 |

OTHER PUBLICATIONS

J. C. Whitney & Co. Cat. No. 451B, p. 18, undated.

Primary Examiner—James Lowe
Attorney, Agent, or Firm—Fay, Sharpe, Beall Fagan, Minnich & McKee

[57] ABSTRACT

A method of forming a selectively expansible pocket or bulge in a thin plastic sheet to facilitate the use of the sheet as a surface protector or shield includes the step of applying oppositely directed forces to the sheet in a plurality of intermeshed closely spaced lines about a predetermined area in which it is desired to form a pocket. The forces are applied until stretching, thinning, and permanent deformation of the sheet takes place along the lines to produce a plurality of permanent corrugations to permit lateral deflection of the predetermined area.

5 Claims, 3 Drawing Sheets

METHOD OF FORMING A SURFACE PROTECTOR WITH AN EXPANSIBLE POCKET

BACKGROUND OF THE INVENTION

The subject invention is directed to a method of forming a shield device. The invention is especially suited for forming water deflectors of the type used in the automotive industry to protect the interior of door panels and will be described with particular reference thereto; however, the invention is capable of broader application and could be used for forming paint masks or similar shields or protective devices for either temporary or permanent installation to a subjacent surface.

In the commonly assigned U. S. Pat. No. 4,696,848 issued Sept. 29, 1987, to Wallace R. Jones, et al., there is disclosed a surface protector and a method of forming the same which allows a flat plastic sheet to include a laterally deflectable bulge or pocket so that the plastic can be used on surfaces which include a surface discontinuity such as a recess or protuberance. For example, such bulges or pockets are desirable when the protectors are used as a water deflector on a vehicle doors. The pockets allow the protectors to encompass ashtrays, radio speakers, and similar devices which extend inwardly of the door from the inner door panel.

In the method disclosed in the above discussed prior patent, the bulges or protuberances are formed by vacuum forming a plurality of small, closely spaced corrugations about the area in which is desired to provide a bulge or pocket. Preferably, the corrugations are forced in a manner to allow the pocket forming area to lie nearly within the plane of the entire sheet until it is desired to move the pocket forming area to its deflected position. This offers significant advantages because the deflector sheets with the pocket forming areas can be readily stacked and stored as compared to those sheets wherein the pockets or bulges are fully formed in their deflected position.

As can be appreciated, the prior deflector sheets wherein the pockets or bulges are formed by thermoforming operations require that the corrugations or pocket forming areas be formed on individual sheets. That is, the sheets must be formed individually and multiple numbers of sheets cannot be processed simultaneously. Accordingly, production rates can be increased only by increasing the number or speed of the thermoforming presses available.

The subject invention provides a method of forming the pockets or bulges which does not require thermoforming presses and which allows multiple sheets to have the pockets formed therein simultaneously without using thermoforming presses.

SUMMARY OF THE INVENTION

In accordance with the subject invention, a suitable pocket or bulge is formed in a relatively flat sheet of thin, flexible plastic material by engaging opposite sides of the sheet with cooperating, intermeshing die members, and moving the die members toward one another to produce localized stretching and permanent deforming of the sheet in closely spaced lines. The stretching and permanent deformation is carried out to produce a multiplicity of shallow permanent deformations in the form of corrugations in the sheet about the area which overlies the location of the desired pocket. The localized stretching and permanent deformation can be carried out while the plastic sheet is substantially at room temperature. That is, it is not necessary to heat the plastic sheet to its thermoforming temperature. In addition, because the process is carried out while the sheet is at room temperature and, further because the forces are applied in localized areas, it is possible to form the corrugations simultaneously in a stack of the sheets. That is, the forces can be applied directly to opposite faces of an aligned stack of the sheets.

In accordance with a more limited aspect of the invention, the forces producing the localized stretching and permanent deformation are applied to the sheet in a plurality of closely spaced, generally parallel lines which enter the sheet from opposite directions. The forces are applied until stretching, thinning and permanent deformation of the sheet takes place along a first and second plurality of closely spaced lines to thereby produce a plurality of relative closely spaced and shallow produce a plurality of relative closely spaced and shallow deformations in the sheet.

With the deformations or corrugations permanently formed in the sheet, the area about which the corrugations extend can be laterally deflected relative to the main plane of the sheet to thereby produce a pocket or bulge. As is apparent from the foregoing, the subject method allows the pocket or bulge-forming corrugations to be introduced into the sheet with standard presses of the type used for sheet trimming and scoring operations. In addition, as noted earlier, a plurality of sheets in stacked form can be processed simultaneously.

Accordingly, a primary object of the present invention is the provision of a method for forming bulges or pockets by introducing a plurality of small closely spaced corrugations into individual sheets of plastic material without the use of thermoforming presses or without the necessity of significantly raising the temperature of the individual sheets.

Yet another object is the provision of a method of providing pocket forming corrugations in a multiplicity of sheets simultaneously through the direct application of force to the sheets while they are in a stacked relationship.

A further object is the provision of a method of forming expansible pockets in plastic sheets through the use of conventional trimming and scoring presses.

Yet another object is the provision of a method of the type described which is extremely simple to practice and can produce expansible pockets having substantially any desired shape.

BRIEF DESCRIPTION OF THE DRAWINGS

The above and other objects and advantages will become apparent from the following description when read in conjunction with the accompanying drawings wherein:

Referring more particularly to the drawings wherein the showings are for purpose of illustrating a preferred embodiment of the invention only, and not for the purpose of limiting same, FIG. 1 shows the overall arrangement of a shield device formed in accordance with the subject invention. In the FIG. 1 showing the shield device 10 is intended for use as a water deflector in a vehicle door assembly. In particular, the deflector 10 of FIG. 1 comprises a continuous, relatively thin sheet 12 formed of a suitable plastic and having an outer periphery 14 which is cut or trimmed to conform to the surface area to be covered by the protector. Many different types of plastic have the characteristics required for forming the water deflector 10. Specifically, however, low density and linear low density polyethylene, both regular and flame retardant, as well as unoriented polypropylene have been used in the practice of the subject invention. Preferably, and for reasons which will subsequently become apparent, the plastic used should have the ability to undergo significant stretching and permanent thinning and deformation while at essentially room temperature.

Figure 1:
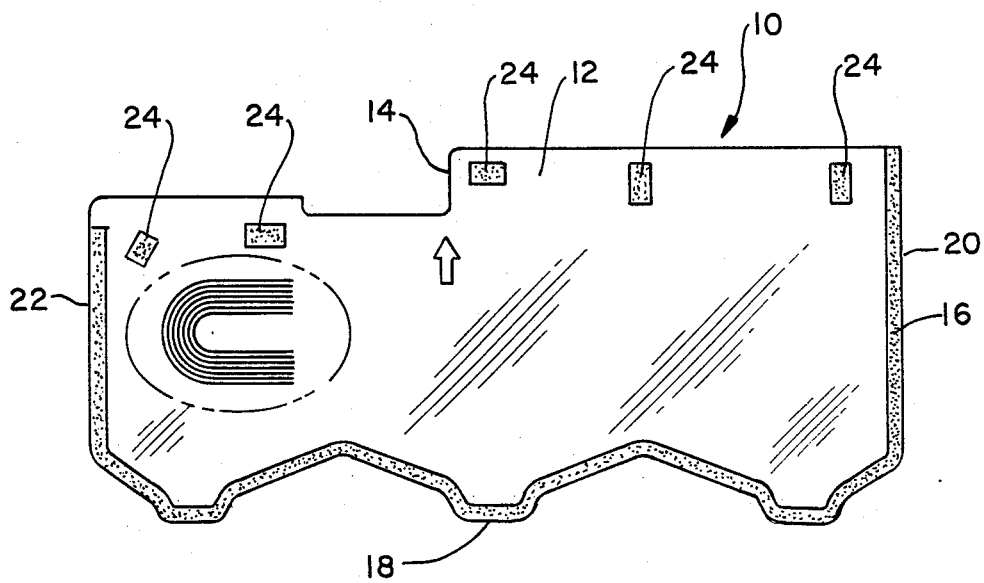
FIG. 1 is a plan view of a protector or shield device incorporating an expansible pocket formed in accordance with a preferred embodiment of the subject invention.

Referring again to FIG. 1, it will be noted that the protector 10 include a continuous band of suitable pressure sensitive adhesive 16 applied about the lower peripheral edge 18 as well as the vertical side edges 20 and 22. In addition, spaced-apart rectangular areas of adhesive can be applied at locations adjacent the top edge of the sheet as shown, for example, at areas 24. As described in the prior, commonly assigned U. S. Pat. No. 4,469,732, the disclosure of which is incorporated herein by reference, the surface of the sheet to which the adhesive is to be applied is preferably treated in a manner to modify the surface characteristics and enhance the bonding of the adhesive to the sheet. Corona discharge treatment is a preferred method for producing the suitably modified surface characteristics. Many different types of adhesives could be used. It is, of course, necessary that the adhesives have substantially permanently tacky, pressure sensitive characteristics. Additionally, many known techniques are suitable for applying the adhesive so long as they produce an application which has a relatively uniform thickness which is desirably less than the thickness of the sheet.

In the practice of the subject method subsequently to be described, it has been found desirable that the adhesive be applied to the sheet prior to cutting the sheet to its desired final peripheral shape. Typically, the adhesive and the sheet are processed to at least partially cure the adhesive so that it is in a permanently tacky and sticky condition prior to the cutting operation. Of course, with the cutting operation, any necessary internal openings or apertures or the like may be cut through the panel to provide access to the areas of the surface being protected.

Figure 2:
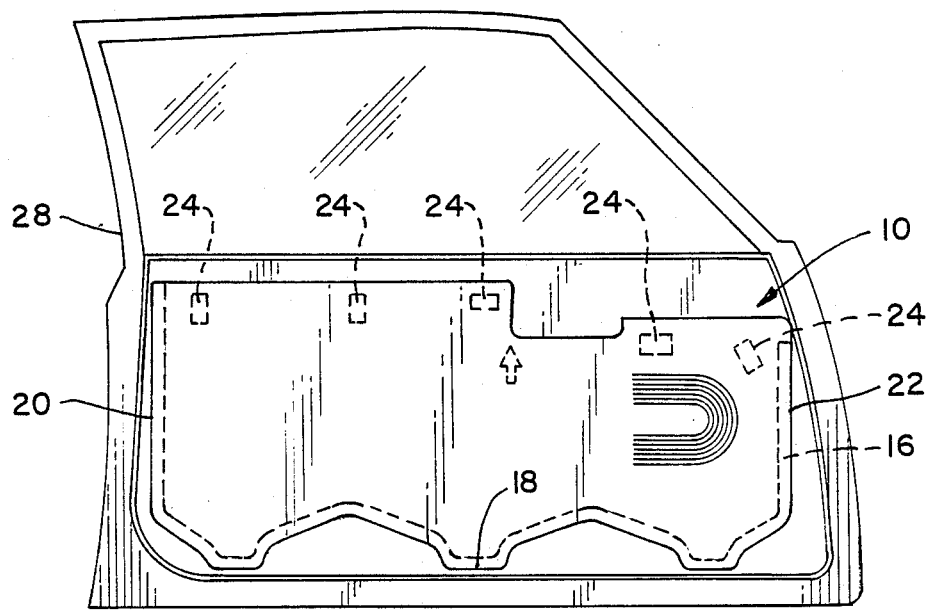
FIG. 2 is an elevational view of a vehicle door having the shield device of FIG. 1 installed therein.

As mentioned, the protector 10 is intended for use as a water deflector on a vehicle door. Referring to FIG. 2, the door 28 is illustrated as typical and shows the protector 10 in place thereon. As discussed, the deflector 10 is shaped to overlie the area of the interior door panel which is to be protected. In many instances, a completely flat protector can function adequately to protect the area and conform to the desired or necessary contour. However, as discussed in the aforementioned commonly assigned patent, it is oftentimes necessary or desirable to have bulges or pockets to extend about or provide space into which various mechanisms or structures can extend. In the embodiment under consideration, it would be desirable if the area 30 were provided with a pocket forming bulge portion capable of receiving and conforming to the magnet and cone of a door mounted speaker. In the commonly assigned prior U. S. Pat. No. 4,696,848, there is disclosed a method of providing the necessary bulges or pockets through the use of a plurality of closely spaced corrugations. According to the noted patent, the corrugations are formed using conventional thermoforming techniques of either the vacuum or pressure type. As discussed, however, this particular method of forming the corrugations for the pocket or bulge portions is somewhat disadvantageous because of the necessity of using a multiplicity of thermoforming presses in order to achieve the production volumes often needed. In addition, attempts to form multiple layers or stacks of the sheets simultaneously has not been possible with the thermoforming techniques previously used.

In accordance with the subject invention, there is provided a method which allows the necessary pocket forming areas to be formed in the sheets while the sheets are at or near room temperature and without the use of thermoforming equipment. In addition, the present method allows relatively conventional presses to be used for both the sheet cutting and the pocket forming operations.

Figure 3:
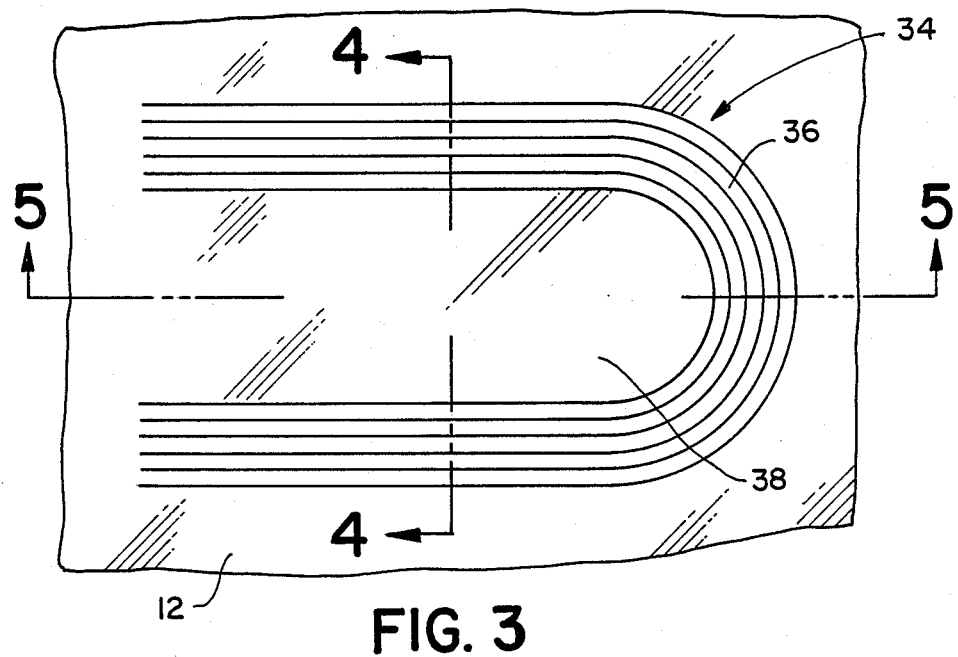
FIG. 3 is an enlarged view of the circled portion of FIG. 2.
Figure 5:
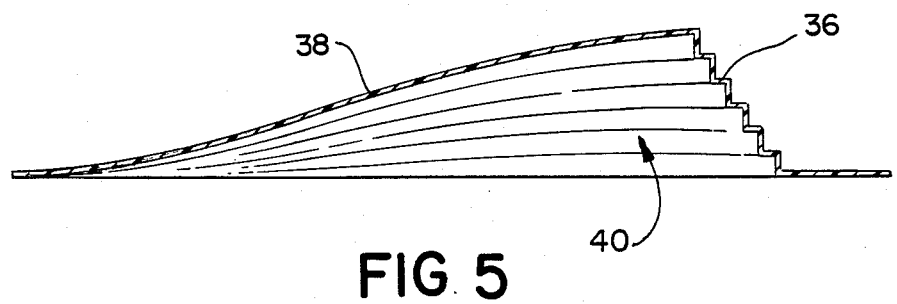
FIG. 5 is a cross-sectional view taken on line 5—5 of FIG. 3 but showing the expansible pocket in its expanded or pocket forming condition.
Figure 4:
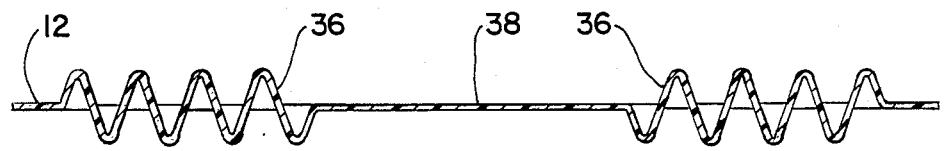
FIG. 4 is a cross-sectional view taken on line 4—4 of FIG. 3 but showing the pocket forming area in its non-expanded position.

FIG. 3 illustrates the area shown circled in FIG. 2. Specifically, FIG. 3 shows the area greatly enlarged and the pocket forming section 34 is illustrated as a closely spaced series of corrugations 36 which surround the area 38 in a generally U-shaped configuration. As illustrated in FIG. 4, the corrugations 36 extend outwardly from the plane of sheet 12 in opposite directions. As discussed in the aforementioned prior patent, the size and spacing of the corrugations can vary substantially but for a typical application the total height of the corrugations can be in the range of ⅛ of an inch for plastic having a thickness of approximately 0.005 inches. With the corrugations formed a shown in FIGS. 3 and 4, the sheet area 38 can be deflected outwardly by applying force thereto. Specifically, as shown in FIG. 5, outward deflection of the surface portion or area 38 forms a pocket 40.

According to the subject invention the pattern of corrugation shown in FIG. 4 is produced by applying first and second oppositely directed forces to the sheet 12 in continuous lines corresponding to the corrugations 36 illustrated in FIG. 3.

Figure 6:
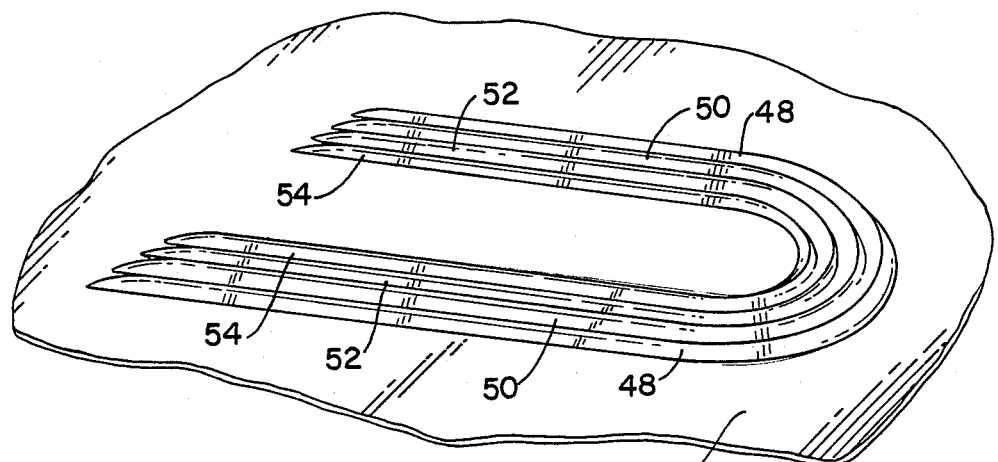
FIG. 6 is a pictorial view of one-half of a die assembly which can be used in performing the subject
Figure 7:
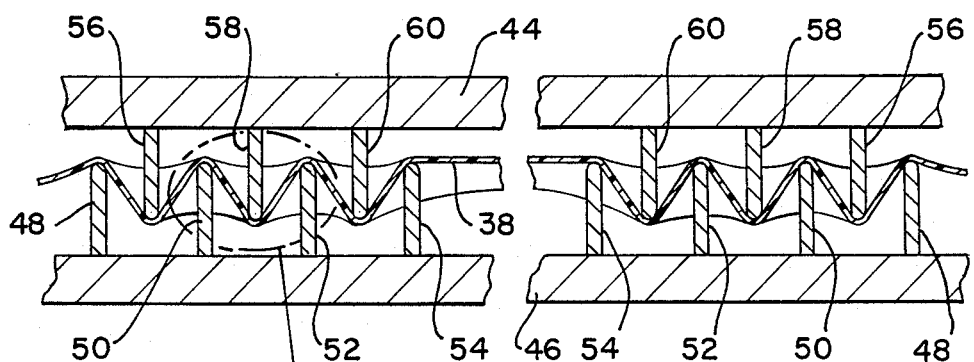
FIG. 7 is a transverse cross-sectional view through a die assembly in the process of forming the expansible pocket according to the subject invention; and, FIG. 8 is an enlarged view of the circled area of FIG. 7.

FIG. 7 illustrates a preferred method for applying the necessary forces. In applying the forces they must be applied such as to cause localized stretching, thinning and permanent deformation of the sheet in closely spaced lines to thereby produce the plurality of relatively closely spaced and shallow corrugations necessary to allow the lateral deflection of the area 38. The apparatus shown broadly in FIG. 7 comprises upper and lower die plates 44, 46 respectively. The plate 46 carries a plurality of closely spaced parallel extending rigid members 48, 50, 52 and 54. As best is shown in FIG. 6 these members 48, 50, 52 and 54 are laid out in the required pattern about the enclosed space which corresponds to area 38. As noted, the members 48, 50, 52 and 54 are rigid and, in the subject embodiment are made from steel "creasing rule" material. The upper die plate 44 includes similar members 56, 58 and 60 laid out in a pattern corresponding to the pattern of the lower die members. The members 56, 58 and 60, are, however, arranged to lie midway between the lower members. In effect, the members of the two dies intermesh to allow oppositely directed forces to be applied simultaneously.

Figure 8:
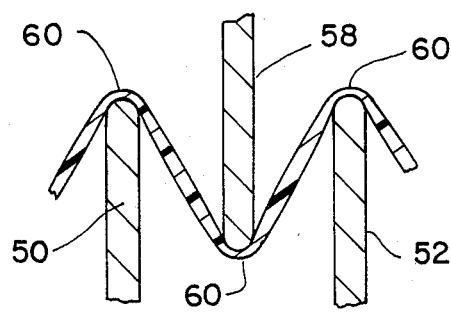

With the die members 44 and 46 in a spaced apart relationship, the sheets 12 can be positioned therebetween and the dies aligned with each other to encompass the predetermined area in which the pocket is to be formed. Thereafter, the dies may be moved toward one another trapping the plastic sheet therebetween. As the two dies 44, 46 move toward each other, the required forces are applied to the sheet in the predetermined parallel line patterns necessary to produce the required corrugations. The forces applied to the sheets 12 must be sufficient produce localized thinning, stretching and permanent deformation of the plastic sheet in rows aligned with the various die elements 48, 50, 52 and 54. Specifically, as shown in FIG. 8, the areas of the sheet identified with the numeral 60 undergo significant thinning and permanent deformation. That is, these areas extend the full length of the die members and because the sheet is stretched and thinned in these areas, the required corrugations are produced and permanently formed into the sheet about the area 38.

It is possible, of course, to form the corrugations by applying the forces to the individual sheets as illustrated in FIG. 7. An important advantage of the subject invention is, however, that the method can be practiced on multiple sheet stacks of the sheets 12. Specifically, as many as 10 to 20 of the sheets can be placed in a stacked relationship and the necessary forming forces applied through the use of the dies 44, 46. It is, of course, appreciated that the necessary pocket forming steps can be performed either prior to or subsequent to the application of the adhesive and the trimming of the sheets to the desired peripheral shape. It is also to be understood that the backs of the sheets or the non-adhesive side can be treated with suitable silicon release materials or the like to prevent the stack of sheets from bonding to one another if the adhesive has been applied prior to the forming operation.

Although the dies shown in FIG. 7 have only a limited number of the force applying members, it should be appreciated that a significantly larger number could be used. Additionally, the members could be continuous about the pocket forming area or only partially enclose the area as shown.

The invention has been described with reference to preferred and alternate embodiments. Obviously, modification and alterations will occur to others upon the reading and understanding of this specification. It is intended to include all such modifications and alterations insofar as they come within the scope of the appended claims or the equivalents thereof.

What is claimed is:

1. A method of forming a shield device for protecting a surface having a discontinuity comprising the steps of:
   (a) providing a relatively flat sheet of thin, flexible plastic material having a peripheral size and shape generally corresponding to the size and shape of the surface;
   (b) determining the area of said sheet which will overlie said discontinuity when said sheet is placed in a protecting relationship on said surface; and,
   (c) positioning a plurality of said sheets in aligned, stacked relationship; and, engaging opposite sides of said stack of sheets with cooperating, intermeshing die members and moving said die members toward one another to produce localized stretching and permanent deformation of each of said sheets in said stock of sheets in closely spaced lines deflected a short distance out of the plane of each of the sheets to form a plurality of relatively closely spaced, small, and relatively shallow deformations in each said sheet about the area determined to overlie said discontinuity for allowing said area to be selectively deflected laterally of the plane of the sheet to define a pocket-like portion for generally conforming to said discontinuity on said surface.

2. The method as defined in claim 1 wherein an adhesive is applied to at least one side of each said sheet in predetermined areas for allowing said sheets to be joined to the surface to be protected.

3. The method as defined in claim 2 wherein said adhesive is applied prior to said stretching and deformation step.

4. The method as defined in claim 1 wherein said deformations comprise continuous corrugations extending in generally parallel relationship about said area determined to overlie said discontinuity.

5. The method as defined in claim 1 wherein said deformations comprise corrugations which extend laterally from the surface of said sheet.

* * * * *